(12) United States Patent
Chen

(10) Patent No.: US 11,307,089 B2
(45) Date of Patent: Apr. 19, 2022

(54) LIGHT SENSING DEVICE

(71) Applicant: ANPEC ELECTRONICS CORPORATION, Hsinchu (TW)

(72) Inventor: Chih-Ning Chen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/144,078

(22) Filed: Jan. 7, 2021

(65) Prior Publication Data

US 2022/0082433 A1   Mar. 17, 2022

(30) Foreign Application Priority Data

Sep. 14, 2020 (TW) ................. 109131441

(51) Int. Cl.
*G01J 1/44*   (2006.01)
(52) U.S. Cl.
CPC ........... *G01J 1/44* (2013.01); *G01J 2001/446* (2013.01)
(58) Field of Classification Search
CPC combination set(s) only.
See application file for complete search history.

(56) References Cited

U.S. PATENT DOCUMENTS

2018/0376082 A1* 12/2018 Liu ................. H04N 5/378

* cited by examiner

*Primary Examiner* — Thanh Luu
*Assistant Examiner* — Monica T Taba
(74) *Attorney, Agent, or Firm* — Li & Cai Intellectual Property Office

(57) ABSTRACT

A light sensing device is provided, which includes a photodiode, a capacitor circuit and an ADC. The ADC includes a comparator, a counter, a reset switch, a logic circuit and a reference voltage switching circuit. The reference voltage switching circuit is controlled by the logic circuit to a determination reference voltage. When a primary integration time ends, a first node has a residual voltage that does not reach a reference voltage, the logic circuit controls the reference voltage switching circuit to provide the determination reference voltage to the comparator or the capacitor circuit within a secondary integration time, and the comparator outputs a comparison signal, the logic circuit receives the comparison signal within the secondary integration time, and determines the secondary value and outputs to the counter. The counter generates a primary value within the primary integration time, and the primary value is combined with the secondary value.

10 Claims, 10 Drawing Sheets

LIGHT SENSING DEVICE

CROSS-REFERENCE TO RELATED PATENT APPLICATION

This application claims the benefit of priority to Taiwan Patent Application No. 109131441, filed on Sep. 14, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light sensing device, and more particularly to a light sensing device with high resolution.

BACKGROUND OF THE DISCLOSURE

Touch-sensitive mobile phones have become more popular nowadays. However, since the mobile phones use touch screens, users may easily touch the screen of the mobile phone when making a call and cause misoperation. Therefore, optical proximity sensors are usually installed on the mobile phones. When the optical proximity sensor detects that the light is blocked, the mobile phone system determines that the face of the user is close to the touch screen and turns off the touch screen to prevent misoperation due to the closeness of the face, while saving power during the call.

Existing light sensors mostly use configurations of a comparator and a counter to detect a sensing current of a photodiode, and the light sensors reset an integration node repeatedly within an integration time, and count output results, that is generated by using the comparator to compare a voltage of the integration node and a reference voltage, by a counter, to determine magnitude of the sensing current.

However, at the end of the integration time, since the voltage of the integration node has not reached the reference voltage, part of residual voltage is not counted by the counter, resulting in a non-linear relationship between the sensing result and the sensing current.

SUMMARY OF THE DISCLOSURE

In response to the above-referenced technical inadequacies, the present disclosure provides a light sensing device with high resolution.

In one aspect, the present disclosure provides a light sensing device including a photodiode, a capacitor circuit, and an analog-to-digital converter (ADC). The photodiode is connected to a first node through a first switch, and configured to provide a sensing current to the first node during a primary integration time. The capacitor circuit is connected to the first node and includes at least one capacitor. The ADC is coupled to the first node and configured to determine a primary value of the sensing current during the primary integration time, and to determine a secondary value of the sensing current within a secondary integration time after an end of the primary integration time. The comparator has a first input terminal connected to the first node, a second input terminal connected to a reference voltage, and the comparator is configured to compare a voltage of the first node with the reference voltage, and output a comparison signal at an output terminal of the comparator. The counter is configured to count the comparison signal according to a clock signal during the primary integration time to generate a primary counting result as the primary value. The reset switch is connected between the first node and a ground terminal, and configured to receive the comparison signal from a control terminal of the reset switch to be switched according to the comparison signal. The logic circuit is connected to output terminals of the counter and the comparator, for receiving the clock signal and the comparison signal, respectively, and configured to control the first switch to be respectively turned on and turned off during the primary integration time and the secondary integration time. The reference voltage switching circuit is connected to the logic circuit, and configured to be controlled by the logic circuit to provide at least one determination reference voltage. When the primary integration time ends, the first node has a residual voltage that does not reach the reference voltage, the logic circuit controls the reference voltage switching circuit to provide the at least one determination reference voltage to the comparator or the capacitor circuit within the secondary integration time, and the comparator is configured to output the comparison signal according to the at least one determination reference voltage and a voltage of the first node. The logic circuit is configured to receive the comparison signal within the secondary integration time, and determine the secondary value based on the comparison signal and output to the counter. The counter is configured to combine the primary value and the secondary value, and output a sensing result.

In some embodiments, the capacitor circuit includes a plurality of capacitors, and a number of the plurality of capacitors corresponds to a predetermined number of bits, and the reference voltage switching circuit further includes a plurality of switches respectively connected to the capacitors, and the plurality of switches are respectively controlled, such that the corresponding capacitors are selectively connected to the reference voltage or ground terminal.

In some embodiments, the logic circuit is configured to switch the switches in a plurality of stages during the secondary integration time, such that the voltage of the first node changes, the comparator compares the voltage of the first node with the reference voltage in the plurality of stages to generate a plurality of comparison results, respectively, and the logic circuit sequentially determines a switching sequence for controlling the plurality of switches in the plurality of stages according to the plurality of comparison results, and correspondingly generate the secondary value according to the plurality of comparison results.

In some embodiments, the logic circuit is configured to write the plurality of comparison results into a register.

In some embodiments, the voltage of the first node is changed in the plurality of stages by $½^N$ times of the reference voltage, N is a positive integer from 1 to M, and M is the predetermined number of bits.

In some embodiments, the plurality of switches are further connected to the reference voltage through a voltage divider, and the voltage divider is controlled by the logic circuit to provide a plurality of dividing voltages less than or equal to the reference voltage.

In some embodiments, the reference voltage switching circuit includes a voltage divider connected to the comparator and the logic circuit, the voltage divider receives the reference voltage and is configured to provide the comparator with a reference dividing voltage less than or equal to the reference voltage, the logic circuit is configured to control the voltage divider in the plurality of stages during the secondary integration time to provide the different reference dividing voltages, the comparator is configured to compare the voltage of the first node with the plurality of reference dividing voltages in the plurality of stages to generate a plurality of comparison results, and the logic circuit determines magnitudes of the plurality of reference voltage divisions in the stages according to the comparison results.

In some embodiments, the logic circuit correspondingly generates the secondary value according to the comparison results and outputs the secondary value to the counter.

In some embodiments, a number of the plurality of reference dividing voltages corresponds to a first predetermined number of bits.

In some embodiments, the ADC further includes a delay circuit connected between the output terminal of the comparator and the control terminal of the reset switch.

Therefore, the light sensing device provided by the present disclosure can detect the residual voltage at the end of the primary integration time, and further convert it into a secondary value with a resolution corresponding to a predetermined number of bits to improve a resolution of the sensing result while improving a linearity of the sensing result of the sensing current.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
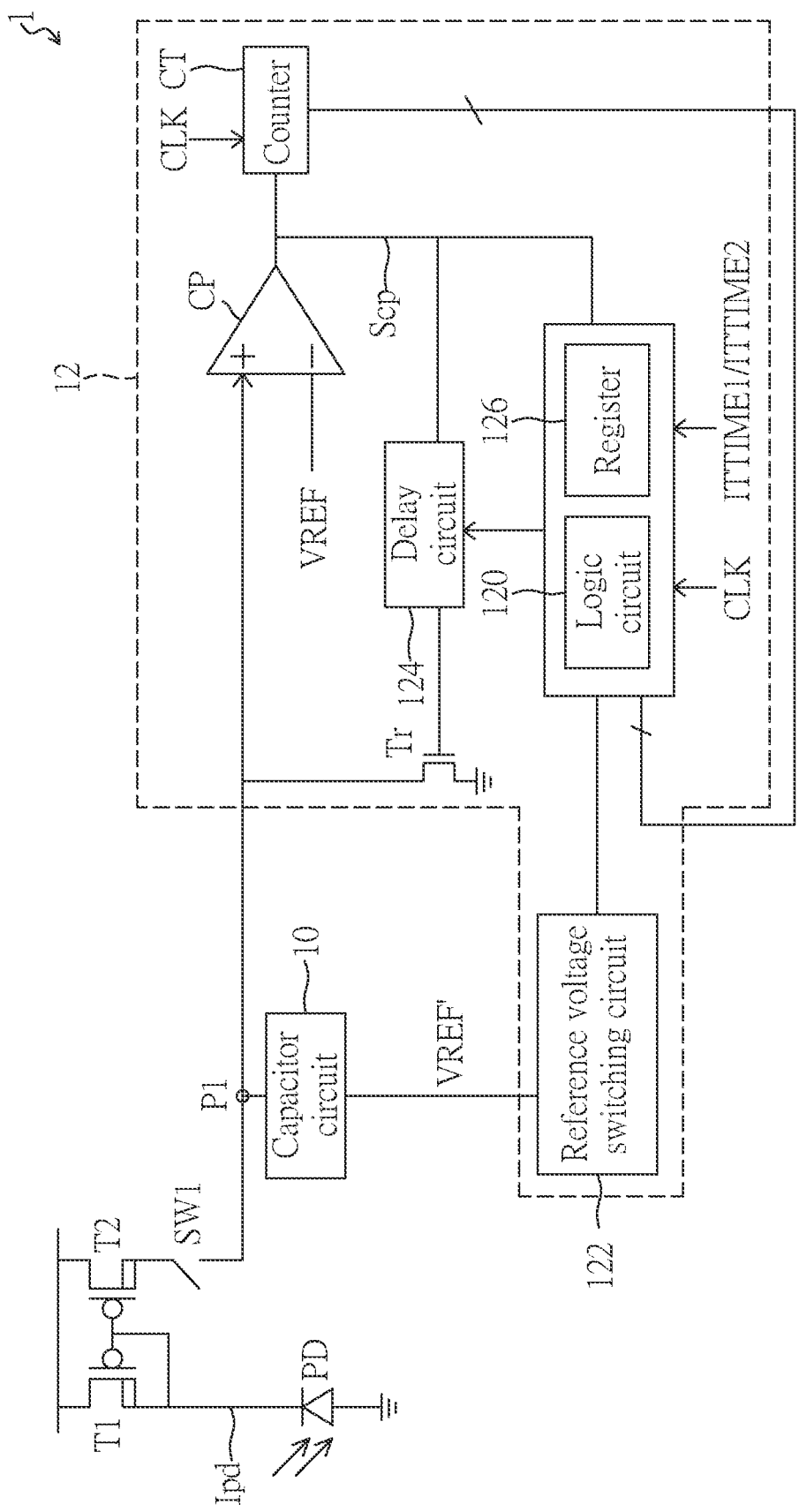
FIG. 1 is a circuit layout of a light sensing device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
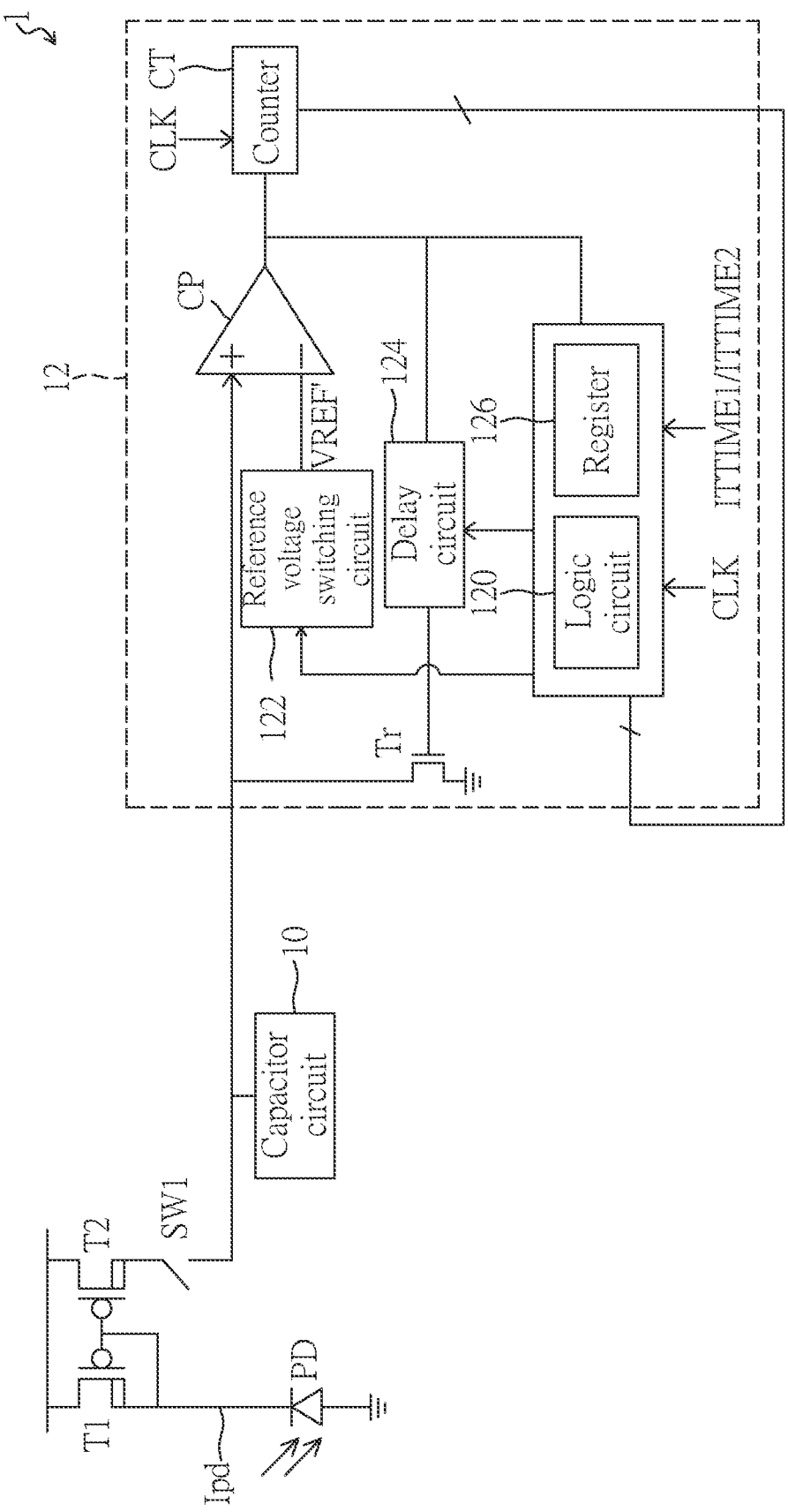
FIG. 2 is another circuit layout of a light sensing device according to the embodiment of the present disclosure.

FIGS. 1 and 2 are respectively a circuit layout diagram and another circuit layout diagram of a light sensing device according to an embodiment of the present disclosure. Reference is made to FIGS. 1 and 2, the embodiment of the present disclosure provides a light sensing device 1 including a photodiode PD, a capacitor circuit 10 and an analog-to-digital converter (ADC) 12.

The photodiode PD is connected to a first node P1 through a current mirror circuit and a first switch SW1, and the current mirror is formed by transistors T1 and T2 and can amplify a sensing current Ipd by a specific magnification and mirror the sensing current Ipd to the first switch SW1, therefore, the photodiode PD can provide the sensing current Ipd to the first node P1 within a primary integration time ITTIME1.

The capacitor circuit 10 is connected to the first node P1 and includes at least one capacitor. The ADC 12 is coupled to the first node P1. Roughly speaking, the ADC 12 can be configured to determine a primary value of the sensing current Ipd in the primary integration time ITTIME1, and determine a secondary value of the sensing current Ipd in a secondary integration time ITTIME2 after the end of the primary integration time ITTIME1.

In further detail, the ADC 12 can include a comparator CP, a counter CT, a reset switch Tr, a logic circuit 120 and a reference voltage switching circuit 122.

As shown in FIGS. 1 and 2, a first input terminal of the comparator CP is connected to the first node P1, and a second input terminal of the comparator CP is connected to a reference voltage VREF. The comparator CP can be configured to compare a voltage of the first node P1 with the reference voltage VREF, and output a comparison signal Scp at an output terminal of the comparator CP.

The counter CT is configured to count the comparison signal Scp according to a clock signal CLK during the primary integration time ITTIME1 to generate a primary count result as the primary value.

The reset switch Tr is connected between the first node P1 and a ground terminal, and is configured to receive the comparison signal Scp from a control terminal thereof to be switched according to the comparison signal Scp. The logic circuit 120 is connected to the output terminals of the counter CT and the comparator CP for receiving the clock signal CLK and the comparison signal Scp, respectively, and is configured to control the first switch SW1 to be turned on and off during the primary integration time ITTIME1 and the secondary integration time ITTIME2, respectively. In some embodiments, the ADC 12 further includes a delay circuit 124 connected between the output terminal of the comparator CP and the control terminal of the reset switch Tr.

The reference voltage switching circuit 122 is connected to the logic circuit 120 and is configured to be controlled by the logic circuit 120 to provide at least one determination reference voltage VREF' in the secondary integration time ITTIME2. The determination reference voltage VREF' can be provided to the capacitor circuit 10 as shown in FIG. 1 or provided to the comparator CP as shown in FIG. 2.

When the primary integration time ITTIME1 ends, the first node P1 has a residual voltage Vpr that does not reach the reference voltage VREF, and the logic circuit 120 controls the reference voltage switching circuit 122 to provide the at least one determination reference voltage VREF' to capacitor circuit 10 as shown in FIG. 1 within the secondary integration time ITTIME2, or provide it to the comparator CP as shown in FIG. 2 within the secondary integration time ITTIME2.

Then, the comparator CP can be configured to output the comparison signal Scp according to the at least one determination reference voltage VREF' and the voltage Vp1 of the first node P1. The logic circuit 120 is configured to receive the comparison signal Scp during the secondary integration time ITTIME2, and determine the secondary value based on the comparison signal Scp and output it to the counter CT. The counter CT can be configured to combine the primary value and the secondary value and output a sensing result.

Figure 3:
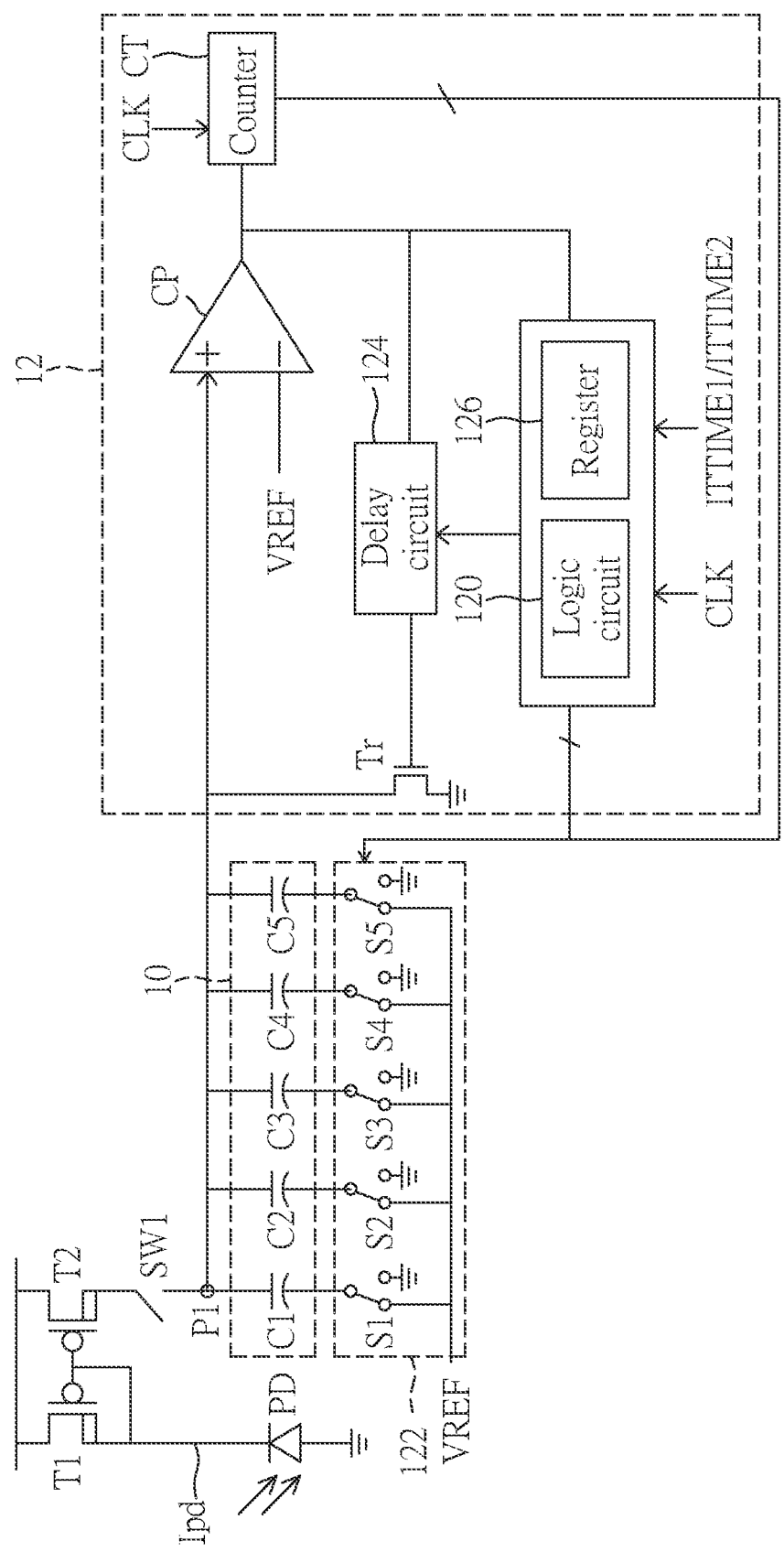
FIG. 3 is a circuit layout diagram of a light sensing circuit according to the embodiment of the present disclosure.

Reference is further made to FIG. 3, which is a circuit layout diagram of a light sensing circuit according to an embodiment of the present disclosure. As shown in FIG. 3, the capacitor circuit 10 can include a plurality of capacitors C1, C2, C3, C4, and C5, and the number of the capacitors C1, C2, C3, C4, and C5 can correspond to a predetermined number of bits. For example, the sensing result can be preset to 16 bits, in which the secondary value occupies 5 bits and is represented by [4:0], and the primary value is represented by [15:5]. In other words, the predetermined number of bits is 5, which corresponds to the number of capacitors C1, C2, C3, C4, and C5.

In this embodiment, the reference voltage switching circuit 122 can include a plurality of switches S1, S2, S3, S4, and S5, respectively connected to capacitors C1, C2, C3, C4, and C5, and the switches S1, S2, S3, S4, S5 can be controlled, such that the corresponding capacitors C1, C2, C3, C4, and C5 are selectively connected to the reference voltage VREF or ground terminal.

The logic circuit 120 is configured to switch the switches S1, S2, S3, S4, S5 in multiple stages within the secondary integration time ITTIME2, such that the voltage Vp1 of the first node P1 changes, and the comparator CP compares the voltage Vp1 of the first node P1 with the reference voltage VREF in the multiple stages to generate a plurality of comparison results. The logic circuit 120 sequentially determines, according to the comparison results, to control a switching sequence of the switches S1, S2, S3, S4, and S5 in the stages, and correspondingly generate the secondary value according to the comparison results.

Figure 4:
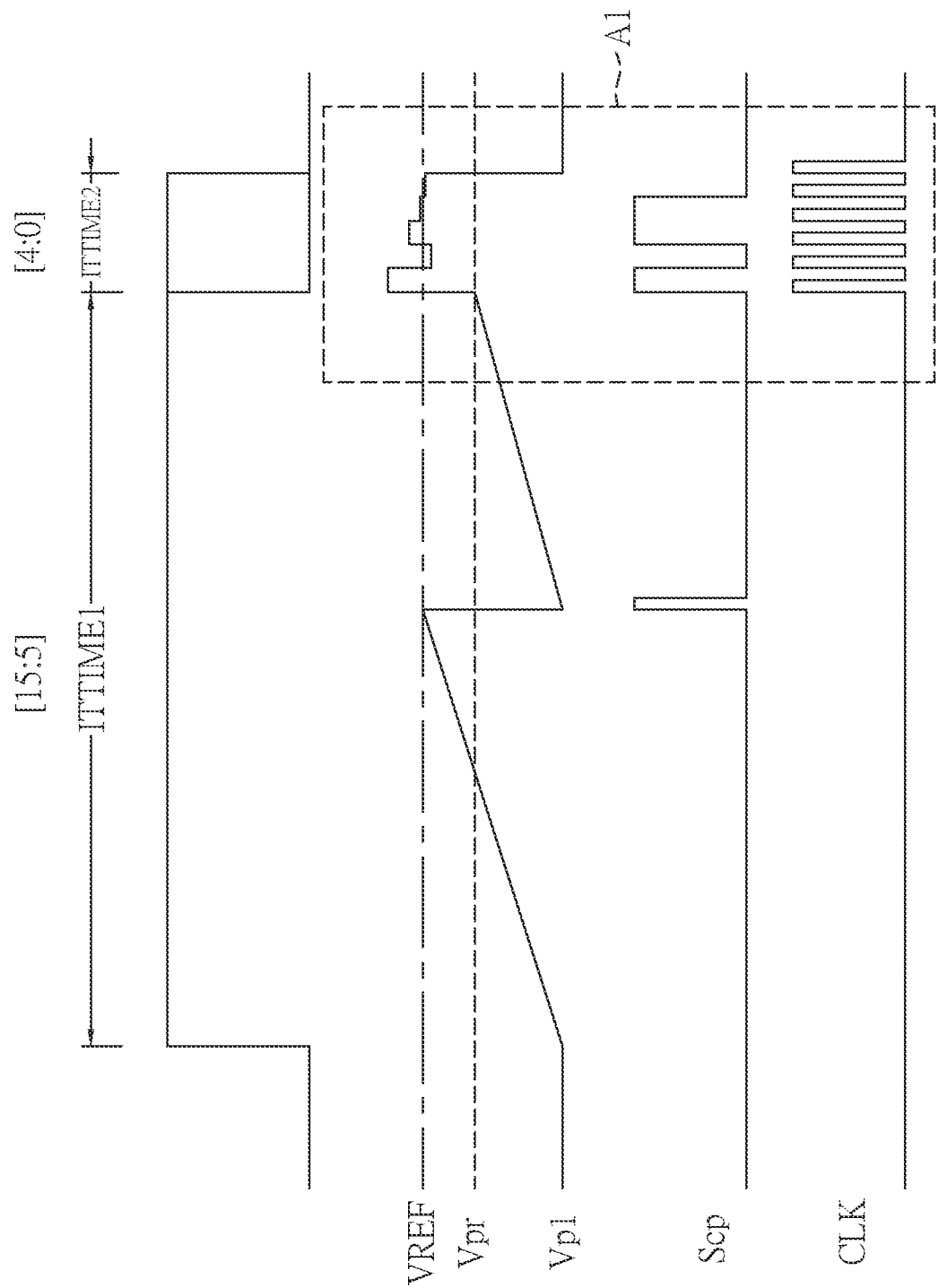
FIG. 4 is a signal timing diagram according to the embodiment of the present disclosure.
Figure 5:
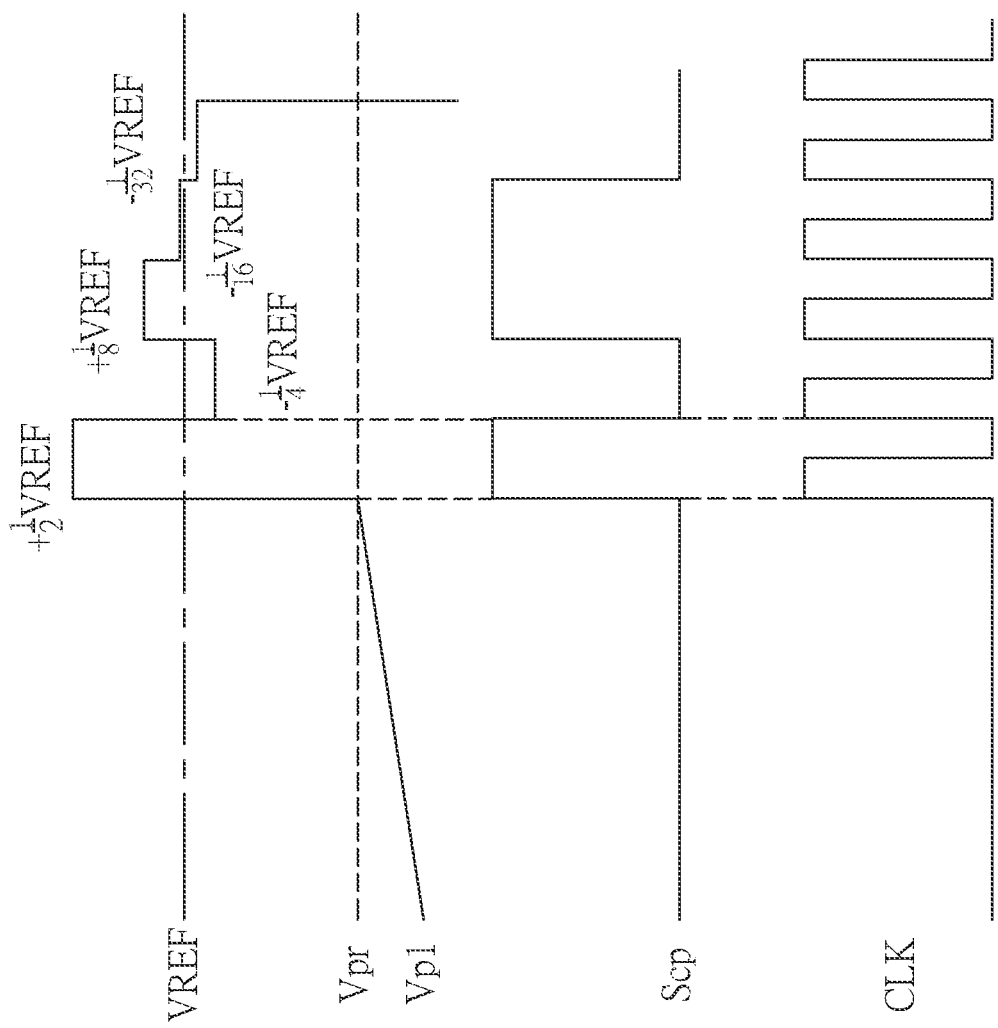
FIG. 5 is an enlarged view of a portion A1 in FIG. 4.

Next, reference is further made to FIGS. 4 and 5. FIG. 4 is a signal timing diagram according to an embodiment of the present disclosure, and FIG. 5 is an enlarged view of portion A1 in FIG. 4.

As shown in FIGS. 4 and 5, it can be seen that when the sensing current Ipd is relatively weak, the voltage Vp1 of the first node P1 will only be greater than the reference voltage VREF once until the primary integration time ITTIME1 ends. At the end of the primary integration time ITTIME1, since the comparison signal Scp of the comparator CP is at low level, the primary value counted by the counter CT is 1.

Next, after entering the secondary integration time ITTIME2, the logic circuit 120 is configured to switch the switches S1, S2, S3, S4, S5 in multiple stages within the secondary integration time ITTIME2, such that the voltage Vp1 of the first node P1 changes. In some embodiments, the voltage Vp1 of the first node P1 is changed in the plurality of stages by $1/2^N$ times of the reference voltage VREF, N is a positive integer from 1 to M, and M is the predetermined number of bits. In this embodiment, N is 1 to 5. In other words, the voltage Vp1 can be changed at ½, ¼, ⅛, ⅟16, ⅟32 times the reference voltage VREF in these stages.

For example, at a moment that a first pulse of the clock signal CLK is received after the start of the secondary integration time ITTIME2, the moment is defined as a first stage, and the logic circuit 120 can control the first switch SW1 to be turned off in the first stage, such that the residual voltage Vpr at this time is retained in the capacitor circuit 10 in the form of a charge. The switches S1, S2, S3, S4, and S5 are further switched, such that the voltage Vp1 of the first node P1 is increased by $1/2^N$ of the reference voltage VREF after the capacitors C1, C2, C3, C4, and C5 are charge-balanced. As shown in FIGS. 4 and 5, when the voltage Vp1 increases by ½ of the reference voltage VREF, the comparator CP will further determine whether the voltage Vp1 is greater than or less than the reference voltage VREF, thereby obtaining a first comparison result corresponding to the first stage.

Taking this embodiment as an example, since the primary value of the counter CT starts from the 6th bits, in other words, the secondary value has a resolution of $2^5$, which is 32-step, and 32-step corresponds to the reference voltage VREF. Therefore, it can be seen from FIGS. 4 and 5 that the first comparison result corresponding to the first stage is that the voltage Vp1 is greater than the reference voltage VREF, which means that the residual voltage Vpr is greater than the reference voltage VREF after increases by ½ of the reference voltage VREF. It can be determined that the residual voltage Vpr is greater than ½ of the reference voltage VREF, and the secondary value of the residual voltage Vpr is greater than 16.

Next, since the first comparison result is that the voltage Vp1 is greater than the reference voltage VREF, the logic circuit 120 then determines that the voltage Vp1 needs to be reduced in a second stage. Therefore, the logic circuit 120 switches the switches S1, S2, S3, S4, S5, to reduce the voltage Vp1 by ¼ of the reference voltage VREF after the capacitors C1, C2, C3, C4, and C5 are charge-balanced.

As can be seen from FIGS. 4 and 5, a comparison result of the second stage is that when the residual voltage Vpr increases by ¼ of the reference voltage VREF (obtained from the residual voltage Vpr+½ of the reference voltage VREF−¼ of the reference voltage VREF) it will be less than the reference voltage VREF. It can be obtained that the residual voltage Vpr is less than ¾ of the reference voltage VREF, and the range corresponding to the secondary value is that the value of the residual voltage Vpr is less than 24.

Therefore, since the second comparison result is that the voltage Vp1 is less than the reference voltage VREF, the logic circuit 120 then determines that the voltage Vp1 needs to be increased in a third stage. Therefore, the logic circuit 120 switches the switches S1, S2, S3, S4, S5, to increase the voltage Vp1 by ⅛ of the reference voltage VREF after the capacitors C1, C2, C3, C4, and C5 are charge-balanced. The comparison result of the third stage is that when the residual voltage Vpr increases by ⅜ of the reference voltage VREF (obtained from the residual voltage Vpr+½ of the reference voltage VREF−¼ of the reference voltage VREF+⅛ of the reference voltage VREF) it will be greater than the reference voltage VREF. It can be obtained that the residual voltage Vpr is greater than ⅝ of the reference voltage VREF, and the range corresponding to the secondary value is that the value of the residual voltage Vpr is greater than 20.

Since the third comparison result is that the voltage Vp1 is greater than the reference voltage VREF, the logic circuit 120 then determines that the voltage Vp1 needs to be reduced in the fourth stage. Therefore, the logic circuit 120 switches the switches S1, S2, S3, S4, and S5 to reduce the voltage Vp1 by 1/16 of the reference voltage VREF after the capacitors C1, C2, C3, C4 and C5 are charge-balanced. The comparison result of a fourth stage is that when the residual voltage Vpr increases by 5/16 of the reference voltage VREF (obtained from the residual voltage Vpr+½ of the reference voltage VREF−¼ of the reference voltage VREF+⅛ of the reference voltage VREF−1/16 of reference voltage VREF) it will be greater than the reference voltage VREF. It can then be obtained that the residual voltage Vpr is greater than 11/16 of the reference voltage VREF, and the range corresponding to the secondary value is that the value of the residual voltage Vpr is greater than 22.

Since the fourth comparison result is that the voltage Vp1 is greater than the reference voltage VREF, the logic circuit 120 then determines that the voltage Vp1 needs to be reduced in a fifth stage. Therefore, the logic circuit 120 switches the switches S1, S2, S3, S4, and S5 to reduce the voltage Vp1 by 1/32 of the reference voltage VREF after the capacitor C1, C2, C3, C4, and C5 are charge-balanced. The comparison result of the fifth stage is that when the residual voltage Vpr increases by 9/32 of the reference voltage VREF (obtained from the residual voltage Vpr+½ of the reference voltage VREF−¼ of the reference voltage VREF+⅛ of the reference voltage VREF−1/16 of the reference voltage VREF−1/32 of the reference voltage VREF) it will be less than the reference voltage VREF. It can then be obtained that the residual voltage Vpr is less than 23/32 of the reference voltage VREF, and the range corresponding to the secondary value is that the value of the residual voltage Vpr is less than 23. Therefore, the obtained upper and lower limit ranges are integrated for the residual voltage Vpr, it can be obtained that the secondary value is about 23, which means that the residual voltage Vpr is approximately 23/32 of the reference voltage VREF.

Then, the logic circuit 120 outputs the secondary value to the counter CT, such that the counter CT can combine the primary value (1 at this time) and the secondary value (23 at this time), and output the sensing result. In the above stages, the logic circuit 120 can be configured to write the comparison results into the register 126, and the secondary integration time ITTIME2 can be about 5 pulses of the clock signal CLK to complete the above calculation. Therefore, a resolution of the sensing result and a linearity of the sensing result of the sensing current can be improved by detecting the residual voltage at the end of the primary integration time, and further converting it into a secondary value with a resolution corresponding to a predetermined number of bits.

Figure 6A:
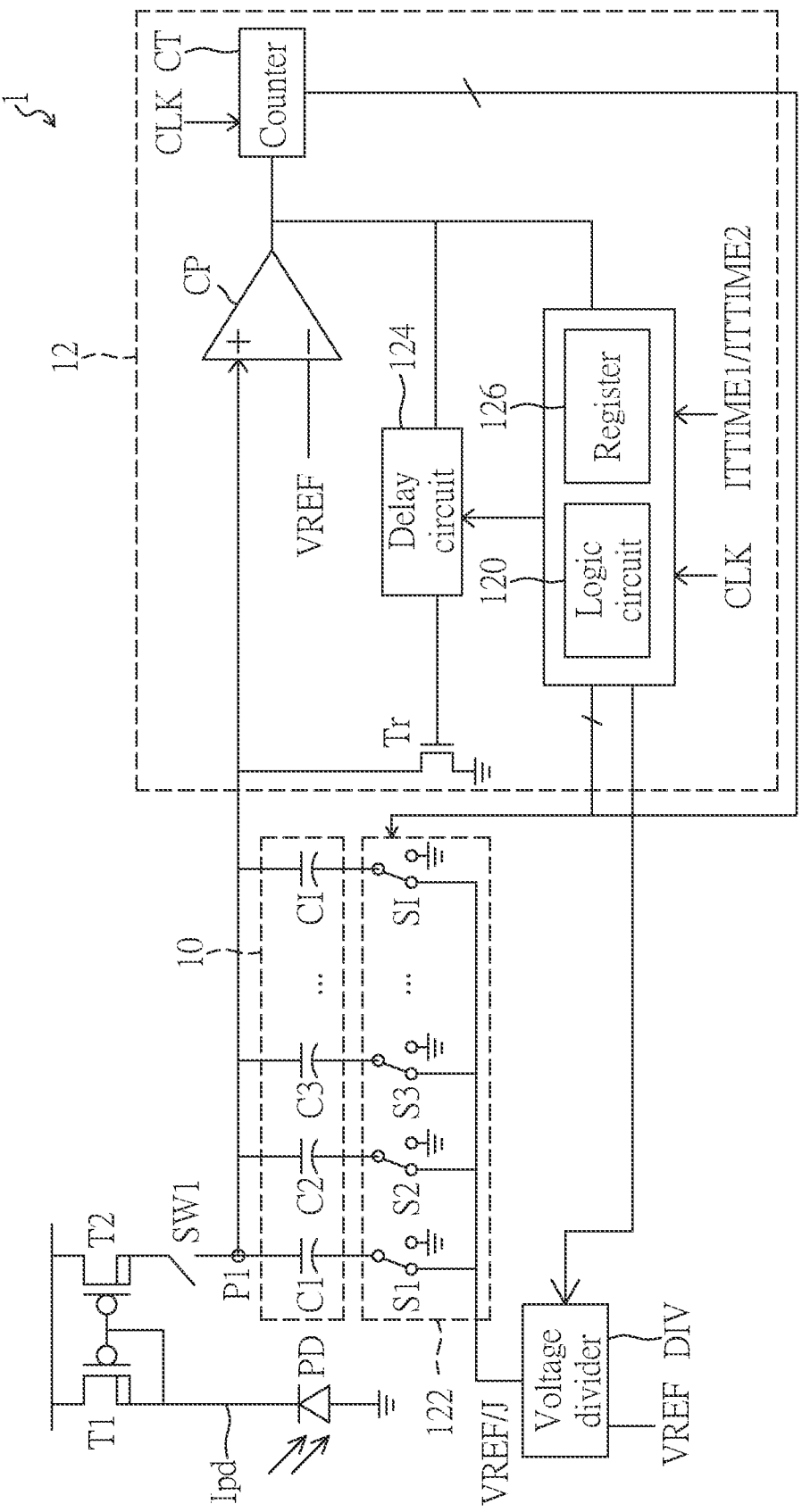
FIG. 6A is a variation layout diagram of a modified circuit based on a circuit of the light sensing device of FIG. 3.

Reference can be further made to FIG. 6A, which is a variation layout diagram of a modified circuit based on a circuit of the light sensing device of FIG. 3. As shown in FIG. 6, the capacitor circuit 10 can include a plurality of capacitors C1, C2 . . . CI, and the reference voltage switching circuit 122 can include a plurality of switches S1, S2 . . . SI, where "I" is the first predetermined number of bits. The switches S1, S2 . . . SI can be connected to the reference voltage VREF through a voltage divider DIV. The voltage divider DIV can be, for example, a voltage divider including an R-2R resistor ladder structure, and can be controlled by the logic circuit 120 to provide a plurality of reference dividing voltages VREF/J less than or equal to the reference voltage VREF. Wherein, the number of reference dividing voltages VREF/J can be set according to requirement for the resolution of the sensing result, and J can be a second predetermined number of bits. Therefore, the primary value and the secondary value can be redistributed in 16 bits, the secondary value can be expressed as [I+J−1: 0], and the primary value can be known as [15: I+J]. Similar to the above operations, the logic circuit 120 can switch the switches S1, S2, . . . , SI, such that the voltage Vp1 will have corresponding changes after the capacitors C1, C2, . . . , CI are charge balanced, thereby meeting needs for higher resolution.

Figure 6B:
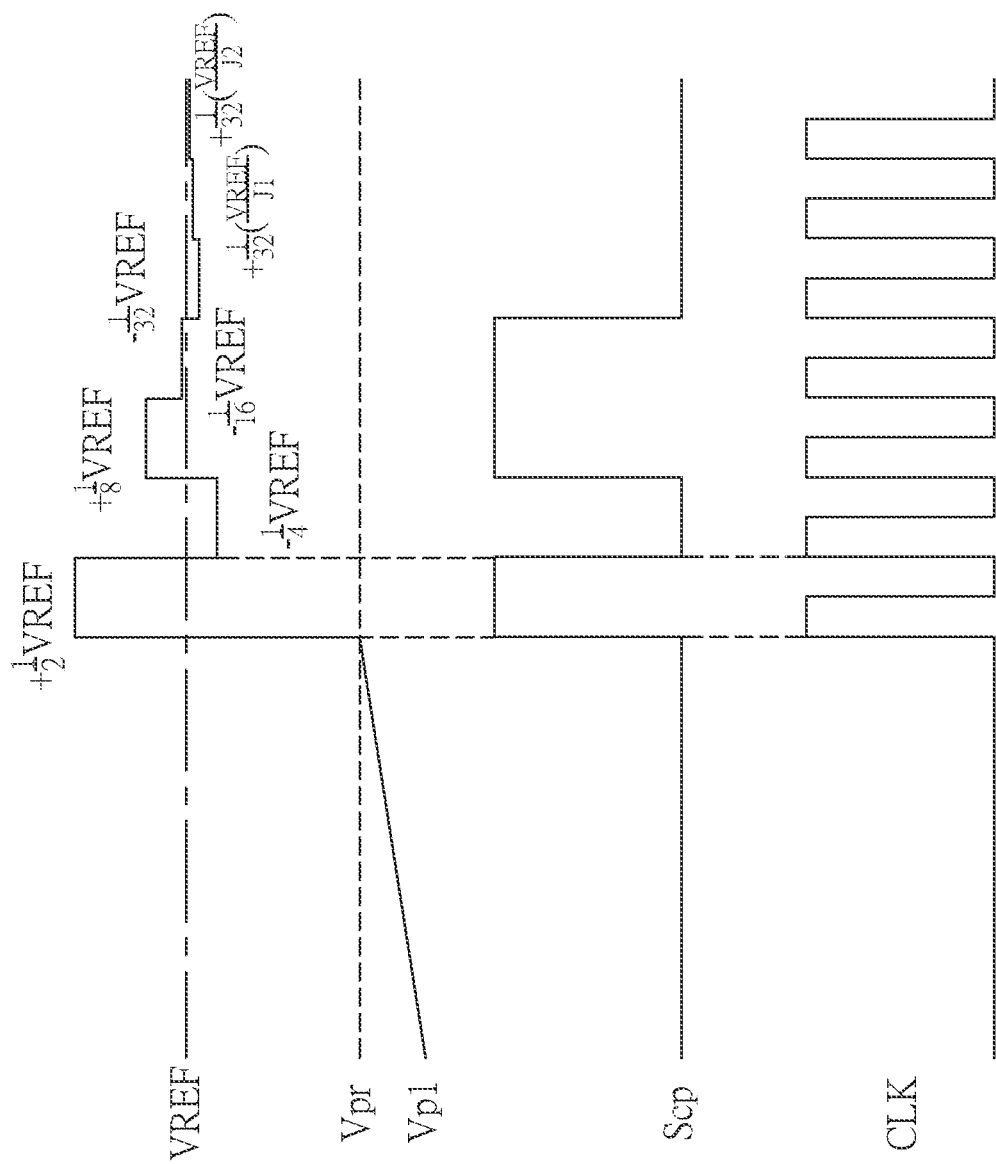
FIG. 6B is a signal timing diagram corresponding to the light sensing device of FIG. 6A.

Reference is further made to FIG. 6B, which is a signal timing diagram corresponding to the light sensing device of FIG. 6A. In this embodiment, since multiple reference dividing voltages VREF/J less than or equal to the reference voltage VREF can be provided, the voltage Vp1 of the first node P1 can be changed by ½, ¼, ⅛, 1/16, 1/32 times of the reference voltage VREF. Further, for example, 1/32*1/J1 times and 1/32*1/J2 times of the reference voltage VREF that less than 1/32 times of the reference voltage VREF can be used to change the voltage Vp1 of the first node P1, therefore, the resolution of the sensing result can be further increased.

Figure 7A:
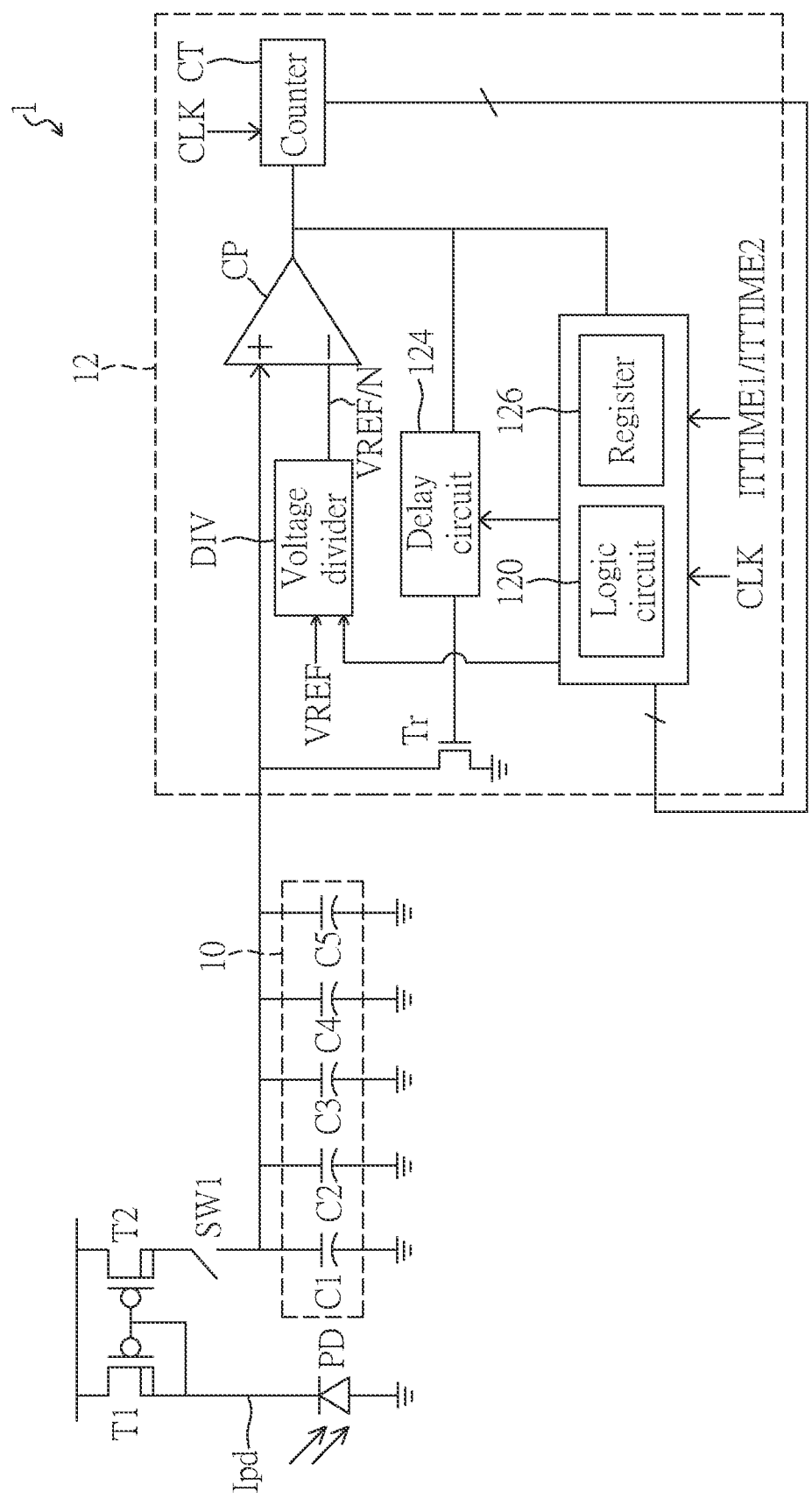
FIG. 7A is a circuit layout of a light sensing device according to another embodiment of the present disclosure.

Moreover, concepts of the present disclosure can also be implemented in another circuit architecture. Reference is made to FIG. 7A, which is a circuit layout of a light sensing device according to another embodiment of the present disclosure. As shown in FIG. 7A, FIG. 7A shows further circuit details of the light sensing device of FIG. 2. The capacitor circuit 10 may also include a plurality of capacitors C1, C2, C3, C4, and C5 connected to ground terminal, and the number of the capacitors C1, C2, C3, C4, and C5 can correspond to a predetermined number of bits. For example, the sensing result can be preset to 16 bits, in which the secondary value occupies 5 bits and is represented by [4:0], and the primary value is represented by [15:5]. In other words, the predetermined number of bits is 5, which corresponds to the number of capacitors C1, C2, C3, C4, and C5.

In this embodiment, the reference voltage switching circuit 122 can include a voltage divider DIV, which is connected to the comparator CP and the logic circuit 120. The voltage divider DIV can be, for example, a voltage divider including an R-2R resistor ladder structure, which receives the reference voltage VREF and can be controlled by the logic circuit 120 to provide the comparator CP with a reference dividing voltage VREF/N less than or equal to the reference voltage VREF.

Similarly, the logic circuit 120 can control the voltage divider DIV in multiple stages within the secondary integration time ITTIME2 to respectively provide different reference dividing voltages VREF/N.

It should be noted that, in the embodiment of FIG. 3, the residual voltage Vpr retained by the first node P1 is changed, and then the comparator CP is used to repeatedly compare and finally obtain an accurate range of the residual voltage Vpr. In this embodiment, the comparison criterion of the comparator CP can be changed continuously, and then repeated comparisons with similar concepts and the secondary value of the residual voltage Vpr can be finally obtained.

Figure 7B:
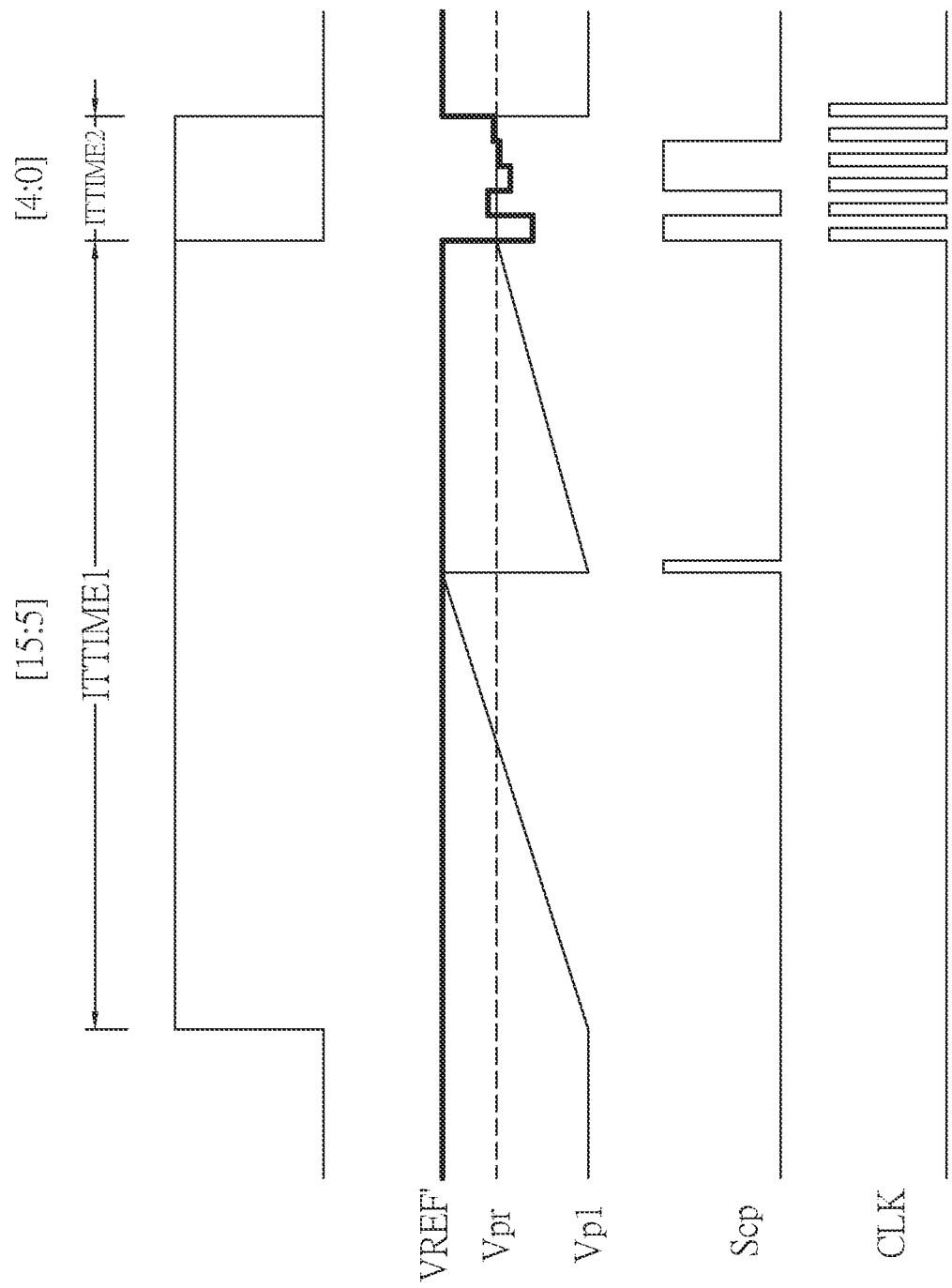
FIG. 7B is a signal timing diagram corresponding to the light sensing device of FIG. 7A.

Reference is further made to FIG. 7B, which is a signal timing diagram corresponding to the light sensing device of FIG. 7A. In this way, the comparator CP can be configured to compare the voltage Vpr of the first node P1 with the reference divided voltages VREF/N during these stages to generate a plurality of comparison results. For example, the logic circuit 120 can control the voltage divider DIV to sequentially provides ½, ¼, ⅛, 1/16, 1/32 times of the reference voltage VREF in different stages, respectively, to generate a new reference voltage VREF' as the reference divided voltage VREF/N. Next, the comparator CP then compares the voltage Vpr with ½, ¼, ⅛, 1/16, and 1/32 times of the reference voltage VREF in each stage, and the corresponding comparison result can be used by the logic circuit 120 as a basis to determine magnitudes of the residual voltage Vpr through the reference divided voltages VREF/N in these stages, respectively.

Similarly, after the logic circuit 120 obtains the secondary value corresponding to the residual voltage Vpr, it can be output to the counter CT and combined with the primary value to finally obtain the sensing result.

Figure 8:
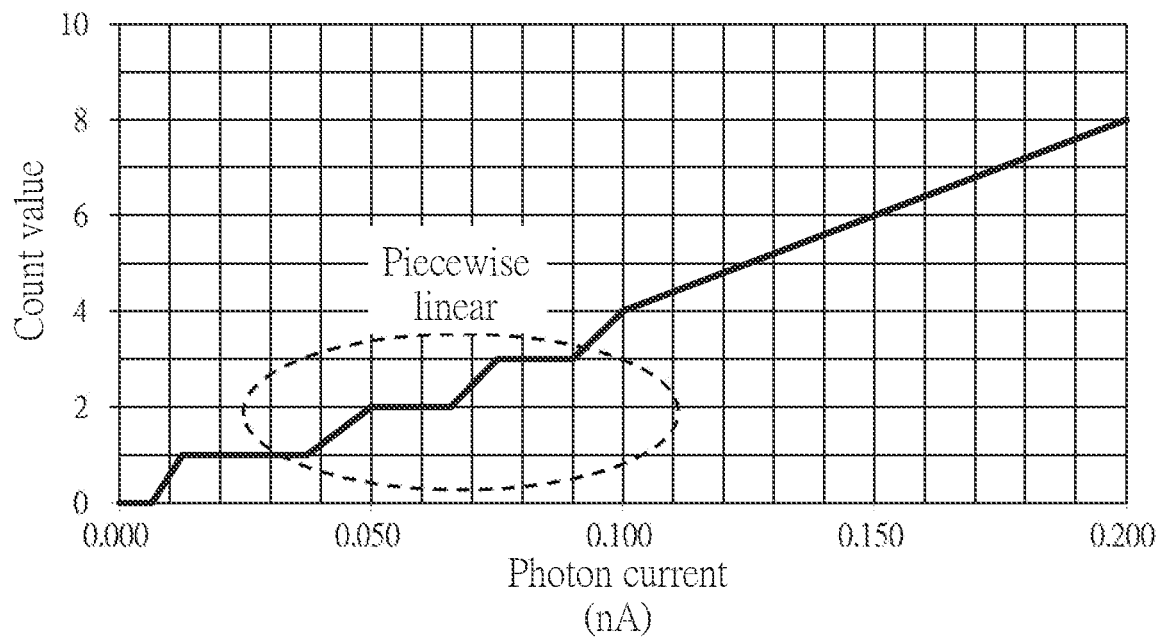
FIG. 8 is a plot diagram of count values versus photocurrents of a conventional light sensor circuit.
Figure 9:
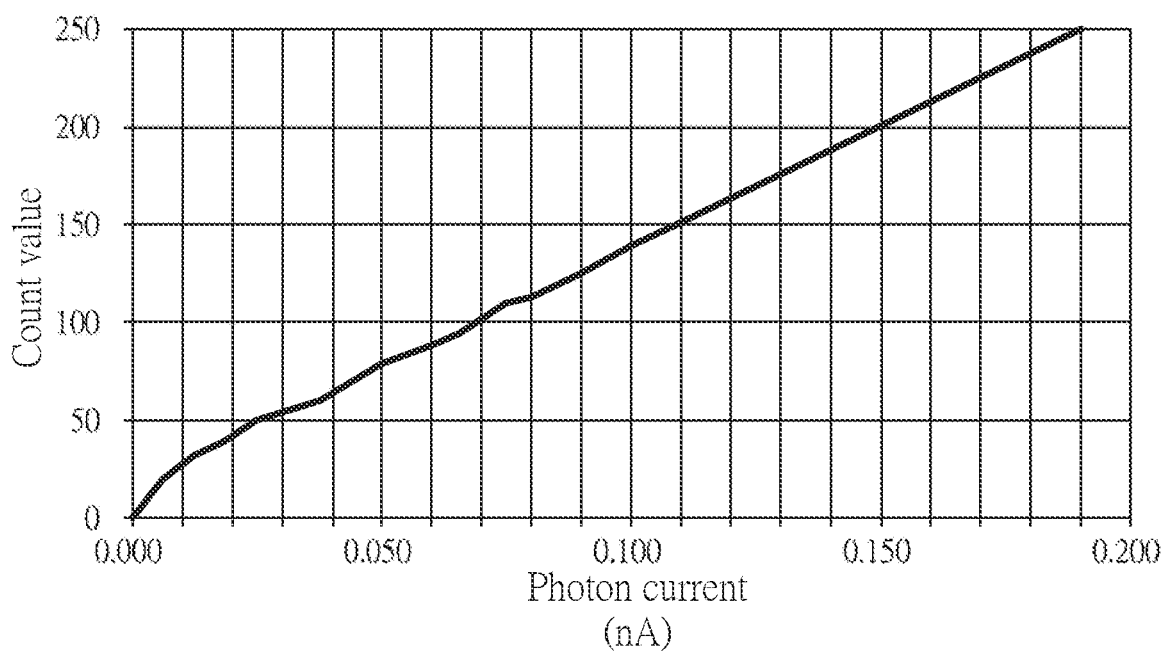
FIG. 9 is a plot diagram of count values of sensing results versus photocurrents using the light sensing circuit of the embodiment of the present disclosure.

Further reference may be made to FIGS. 8 and 9, FIG. 8 is a plot diagram of count values versus photocurrents of a conventional light sensor circuit, and FIG. 9 is a plot diagram of count values of sensing results versus photocurrents using the light sensing circuit of the embodiment of the present disclosure. As shown in FIGS. 8 and 9, by utilizing the light sensing device of the present disclosure, the linearity of the sensing result to the photocurrent can be significantly improved, and piecewise linear defects, caused by the count value of the existing light sensor circuit cannot be accurately detected when the photocurrent is weak, can be eliminated.

In conclusion, the light sensing device provided by the present disclosure can detect the residual voltage at the end of the primary integration time, and further convert it into a secondary value with a higher resolution corresponding to a predetermined number of bits to improve a resolution of the sensing result while improving a linearity of the sensing result of the sensing current.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light sensing device, comprising:
   a photodiode connected to a first node through a first switch, and configured to provide a sensing current to the first node during a primary integration time;
   a capacitor circuit connected to the first node and including at least one capacitor; and
   an analog-to-digital converter (ADC) coupled to the first node and configured to determine a primary value of the sensing current during the primary integration time, and to determine a secondary value of the sensing current after within a secondary integration time after an end of the primary integration time,
   wherein the ADC includes:
      a comparator having a first input terminal connected to the first node and a second input terminal connected to a reference voltage, wherein the comparator is configured to compare a voltage of the first node with the reference voltage, and output a comparison signal at an output terminal of the comparator;
      a counter configured to count the comparison signal according to a clock signal during the primary integration time to generate a primary counting result as the primary value;
      a reset switch connected between the first node and a ground terminal, and configured to receive the comparison signal from a control terminal of the reset switch to be switched according to the comparison signal;
      a logic circuit connected to output terminals of the counter and the comparator, for receiving the clock signal and the comparison signal, respectively, and configured to control the first switch to be respectively turned on during the primary integration time and turned off during the secondary integration time; and
      a reference voltage switching circuit connected to the logic circuit, and configured to be controlled by the logic circuit to provide at least one determination reference voltage;
   wherein, when the primary integration time ends, the first node has a residual voltage that does not reach the reference voltage, and the logic circuit controls the reference voltage switching circuit to provide the at least one determination reference voltage to the comparator or the capacitor circuit within the secondary integration time, and the comparator is configured to output the comparison signal according to the at least one determination reference voltage and a voltage of the first node,
   wherein the logic circuit is configured to receive the comparison signal within the secondary integration time, and determine the secondary value based on the comparison signal and output to the counter,
   wherein the counter is configured to combine the primary value and the secondary value, and output a sensing result.

2. The light sensing device according to claim 1, wherein the capacitor circuit includes a plurality of capacitors, and a number of the plurality of capacitors corresponds to a predetermined number of bits, and the reference voltage switching circuit further includes:
   a plurality of switches respectively connected to the capacitors, and the plurality of switches are respectively controlled, such that the corresponding capacitors are selectively connected to the reference voltage or ground terminal.

3. The light sensing device according to claim 2, wherein the logic circuit is configured to switch the switches in a plurality of stages during the secondary integration time, such that the voltage of the first node changes, the comparator compares the voltage of the first node with the reference voltage in the plurality of stages to generate a plurality of comparison results, respectively, and the logic circuit sequentially determines a switching sequence for controlling the plurality of switches in the plurality of stages according to the plurality of comparison results, and correspondingly generate the secondary value according to the plurality of comparison results.

4. The light sensing device according to claim 3, wherein the logic circuit is configured to write the plurality of comparison results into a register.

5. The light sensing device according to claim 3, wherein the voltage of the first node is changed in the plurality of stages by $\frac{1}{2}^N$ times of the reference voltage, N is a positive integer from 1 to M, and M is the predetermined number of bits.

6. The light sensing device according to claim 3, wherein the plurality of switches are further connected to the reference voltage through a voltage divider, and the voltage divider is controlled by the logic circuit to provide a plurality of dividing voltages less than or equal to the reference voltage.

7. The light sensing device according to claim 1, wherein the reference voltage switching circuit includes a voltage divider connected to the comparator and the logic circuit, wherein the voltage divider receives the reference voltage and is configured to provide the comparator with a reference dividing voltage less than or equal to the reference voltage, wherein the logic circuit is configured to control the voltage divider in the plurality of stages during the secondary integration time to provide the different reference dividing voltages, wherein the comparator is configured to compare the voltage of the first node with the plurality of reference dividing voltages in the plurality of stages to generate a plurality of comparison results, wherein the logic circuit determines magnitudes of the residual voltage Vpr through the plurality of reference voltage divisions in the stages according to the comparison results.

8. The light sensing device according to claim 7, wherein the logic circuit correspondingly generates the secondary value according to the comparison results and outputs the secondary value to the counter.

9. The light sensing device according to claim 7, wherein a number of the plurality of reference dividing voltages corresponds to a first predetermined number of bits.

10. The light sensing device according to claim 1, wherein the ADC further includes a delay circuit connected between the output terminal of the comparator and the control terminal of the reset switch.

* * * * *